(12) United States Patent
Pettersson et al.

(10) Patent No.: US 8,025,045 B2
(45) Date of Patent: Sep. 27, 2011

(54) COOLER ARRANGEMENT FOR A MOTOR VEHICLE

(75) Inventors: Rickard Pettersson, Rönninge (SE); Henrik Nyrén, Södertälje (SE); Rolf Dybdal, Jönåker (SE)

(73) Assignee: Scania CV AB (Publ) (SE)

( * ) Notice: Subject to any disclaimer, the term of this patent is extended or adjusted under 35 U.S.C. 154(b) by 378 days.

(21) Appl. No.: 12/305,679

(22) PCT Filed: Jun. 25, 2007

(86) PCT No.: PCT/SE2007/050463
§ 371 (c)(1),
(2), (4) Date: Dec. 19, 2008

(87) PCT Pub. No.: WO2008/002264
PCT Pub. Date: Jan. 3, 2008

(65) Prior Publication Data
US 2010/0229842 A1 Sep. 16, 2010

(30) Foreign Application Priority Data
Jun. 30, 2006 (SE) ...................................... 0601444

(51) Int. Cl.
*F01P 7/10* (2006.01)
(52) U.S. Cl. ................... 123/568.12; 123/542; 123/563; 123/41.59

(58) Field of Classification Search ............. 123/568.12, 123/568.21, 563, 542, 540, 41.56, 41.48, 123/41.58, 41.59
See application file for complete search history.

(56) References Cited

U.S. PATENT DOCUMENTS
1,393,917 A * 10/1921 Snell ............................... 165/98
(Continued)

FOREIGN PATENT DOCUMENTS
DE  3522591 A1  1/1987
(Continued)

OTHER PUBLICATIONS
International Search Report dated Nov. 1, 2007, issued in corresponding international application No. PCT/SE2007/050463.

*Primary Examiner* — Hai Huynh
(74) *Attorney, Agent, or Firm* — Ostrolenk Faber LLP

(57) ABSTRACT

A cooler device for a motor vehicle including a charge air cooler with a first cooler element, an EGR cooler with a second cooler element arranged substantially in plane with the first cooler element is disclosed. A screening device regulates air flow through the cooler elements. A control mechanism is operable to switch the screening device to and from between an open position and a closed position. A first screening portion allows more air to pass through than a second screening portion when the screening device is in the closed position such that air flow through the first cooler element is limited to a lesser extent than through the second cooler element in the closed position.

12 Claims, 2 Drawing Sheets

U.S. PATENT DOCUMENTS

| | | | | |
|---|---|---|---|---|
| 2,146,501 A | * | 2/1939 | Flautt | 123/41.04 |
| 2,785,620 A | * | 3/1957 | Welch | 55/385.1 |
| 3,759,054 A | | 9/1973 | Graber | |
| 3,759,056 A | * | 9/1973 | Graber | 62/183 |
| 3,854,459 A | * | 12/1974 | Stimeling | 165/98 |
| 4,356,796 A | * | 11/1982 | Tholen | 123/41.31 |
| 4,476,820 A | * | 10/1984 | Nixon | 123/41.05 |
| 4,753,288 A | * | 6/1988 | Harvey | 165/98 |
| 4,924,826 A | * | 5/1990 | Vinson | 123/195 C |
| 6,142,108 A | * | 11/2000 | Blichmann | 123/41.05 |
| 6,475,077 B2 | * | 11/2002 | Arold | 454/156 |
| 6,766,774 B1 | * | 7/2004 | Kussmann | 123/41.48 |
| 6,854,544 B2 | * | 2/2005 | Vide | 180/68.6 |
| 7,766,111 B2 | * | 8/2010 | Guilfoyle et al. | 180/68.1 |
| 7,784,576 B2 | * | 8/2010 | Guilfoyle et al. | 180/68.1 |
| 2010/0229548 A1 | * | 9/2010 | Kardos | 60/599 |

FOREIGN PATENT DOCUMENTS

GB  733188 A  4/1955

* cited by examiner

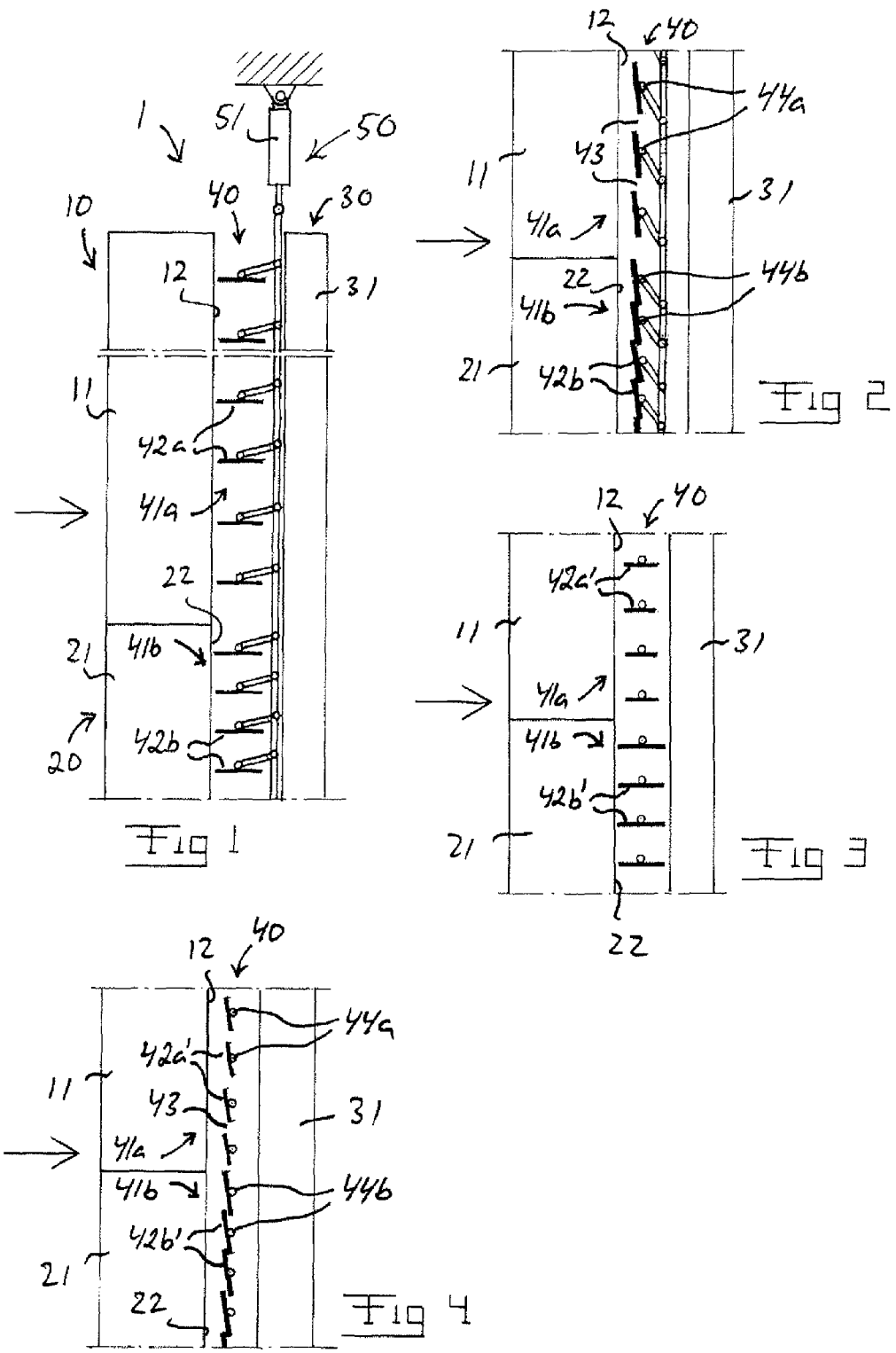

COOLER ARRANGEMENT FOR A MOTOR VEHICLE

CROSS REFERENCE TO RELATED APPLICATION

The present application is a 35 U.S.C. §§371 national phase conversion of PCT/SE2007/050463, filed 25 Jun. 2007, which claims priority of Sweden Application No. 0601444-3, filed 30 Jun. 2006, incorporated by reference herein. The PCT International Application was published in the English language.

FIELD OF THE INVENTION AND STATE OF THE ART

The present invention relates to a cooler device for a motor vehicle comprising a charge air cooler with a first cooler element for cooling of charge air for the motor vehicle's combustion engine and an EGR cooler with a second cooler element for cooling of exhaust gases which are to be led back to said combustion engine, whereby the first cooler element and the second cooler element are arranged substantially in plane with one another.

A motor vehicle with a supercharged combustion engine and a so-called EGR (exhaust gas recirculation) system for leading exhaust gases back to the combustion engine is often provided with a cooler device comprising a charge air cooler with a substantially platelike cooler element for cooling of charge air for the combustion engine and an EGR cooler with a substantially platelike cooler element for cooling of exhaust gases which are to be led back to the combustion engine. The respective cooler elements comprise elongate pipelines and cooling flanges connected to the pipelines, whereby the medium which is to be cooled (i.e. charge air or exhaust gases respectively) is led through these pipelines and is cooled, via the cooling flanges, by ambient air which passes through air passages between the pipelines. The cooling flow of ambient air through the air passages is generated by movement of the vehicle and/or by a fan forming part of the cooler device.

A known way of saving space and achieving a cooler device of simple construction in the case of a cooler device of the type indicated above is to assemble the charge air cooler and the EGR cooler to one another with the charge air cooler's cooler element and the EGR cooler's cooler element arranged beside and substantially in plane with one another.

In a motor vehicle with a supercharged combustion engine and air cooling of the charge air, the inlet air is pressurised by a compressor and the resulting pressurised charge air is thereafter cooled, before being fed into the combustion engine, by a charge air cooler to a temperature a few degrees above the ambient temperature. When the charge air is cooled in the charge air cooler, condensate precipitates in the pipelines of the charge air cooler's cooler element. In cold weather with ambient temperatures below 0° C., there is risk that the precipitated condensate may freeze to ice in the cooler element's pipelines, which may result in undesirable obstruction of the latter. This problem of condensate precipitation and ice formation is usually still greater in an EGR cooler. The risk of ice formation in the cooler elements of the charge air cooler and the EGR cooler can be reduced by limiting the flow of cooling ambient air through the cooler elements.

A known practice is to use various types of screening means, e.g. in the form of louvers, for regulating the air flow through one or more cooler elements of a cooler device in a motor vehicle. These screening means are often arranged immediately in front of or behind one or more cooler elements and are usually maneuverable, either manually or automatically, by a control mechanism to and fro between an open position in which the screening means limits only slightly or not at all the air flow through the relating cooler element or elements, and a closed position in which the screening means substantially completely or at least largely limits the air flow through said cooler element or elements. Various types of such screening means are described in, for example, U.S. Pat. No. 4,753,288A, DE 3 701 584 A1 and DE 7 716 940 U1.

OBJECT OF THE INVENTION

The object of the present invention is to provide a further development of a cooler device of the type indicated in the introduction in order to propose a cooler device with a configuration which in at least some respects affords an advantage relative to a conventionally configured cooler device of a relevant type.

SUMMARY OF THE INVENTION

According to the present invention, said object is achieved with a cooler device exhibiting the features of the invention.
According to the invention, the cooler device comprises:
  a charge air cooler with a first cooler element for cooling of charge air for the motor vehicle's combustion engine,
  an EGR cooler with a second cooler element for cooling of exhaust gases which are to be led back to said combustion engine, whereby the first cooler element and the second cooler element are arranged substantially in plane with one another,
  a screening means which is arranged in front of or behind said cooler elements in order to regulate the air flow through them and which has a first screening portion associated with the first cooler element and a second screening portion associated with the second cooler element, and
  a control mechanism by which said screening means is switchable to and fro between an open position in which the screening portions do not, or at least do not appreciably, limit the air flow through the cooler elements, and a closed position in which the screening portions limit the air flow through the cooler elements in order to counteract ice formation in the latter, whereby the first screening portion allows more air to pass through than the second screening portion when the screening means is in the closed position, in order thereby to regulate the air flow through said cooler elements in such a way that the air flow through the first cooler element is limited to a lesser extent than the air flow through the second cooler element when the screening means is in the closed position.

The expression "air flow" means here the flow of cooling ambient air which passes through air passages between the pipelines of the cooler elements.

The solution according to the invention provides a simple way of using the same screening means to prevent ice formation in both the EGR cooler and the charge air cooler while at the same time making it possible for a satisfactory cooling effect of the charge air cooler, which is less sensitive to ice formation, to be maintained when the screening means is in the closed position, since the first screening portion associated with the charge air cooler's cooler element allows, in the closed position, more air to pass through than the second screening portion associated with the EGR cooler's cooler element.

Various embodiments of the cooler device according to the invention are indicated by the dependent claims and the description set out below.

BRIEF DESCRIPTION OF THE DRAWINGS

The invention is described below in more detail on the basis of embodiment examples with reference to the attached drawings, in which:

FIG. 1 depicts a schematic sideview of part of a cooler device according to a first embodiment of the present invention, showing in an open position a screening means which forms part of the cooler device, FIG. 2 depicts the cooler device according to FIG. 1, with its screening means in a closed position, FIG. 3 depicts a schematic sideview of part of a cooler device according to a second embodiment of the present invention, showing in an open position a screening means which forms part of the cooler device, FIG. 4 depicts the cooler device according to FIG. 3, with its screening means in a closed position.

DETAILED DESCRIPTION OF PREFERRED EMBODIMENTS

Figure 5:
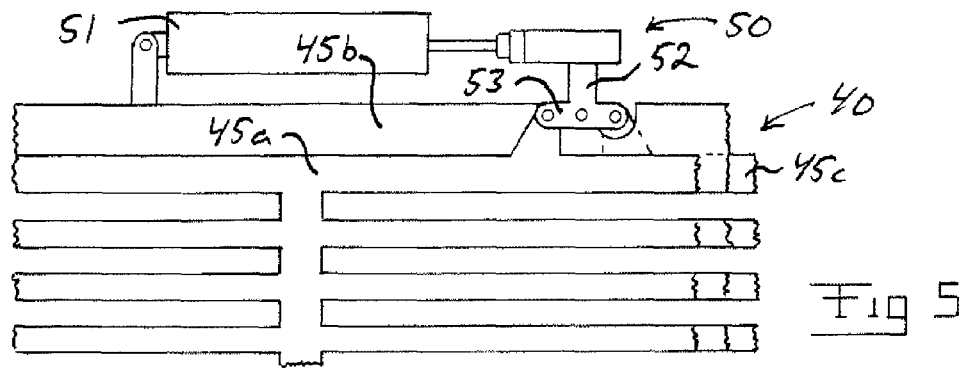
FIG. 5 depicts in an open position a schematic partly sectional front view of part of a screening means according to an alternative embodiment.
Figure 6:
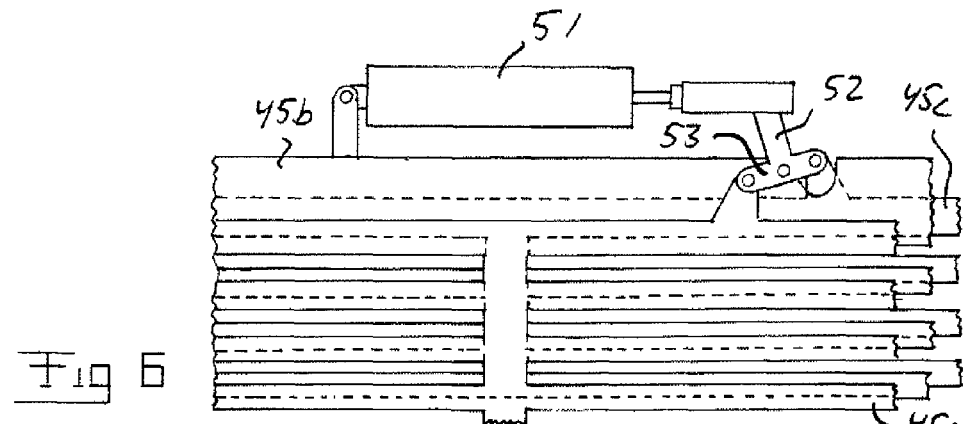
FIG. 6 depicts the screening means according to FIG. 5 in a closed position.

FIGS. 1-11 illustrate a cooler device for a motor vehicle according to various embodiments of the present invention. The cooler device 1 is intended for a motor vehicle which is provided with a supercharged combustion engine and an EGR system. The same or similar parts of the various embodiments in FIGS. 1-11 are given the same reference notations.

The cooler device 1 comprises a charge air cooler 10 of conventional configuration with a substantially platelike cooler element 11 for cooling of charge air for the motor vehicle's combustion engine, i.e. inlet air to the combustion engine which is compressed in a compressor in the motor vehicle before it is supplied to the combustion engine. The charge air cooler 10 is intended to receive via an undepicted pipeline warm charge air from a compressor of the motor vehicle and to be connected via an undepicted pipeline to the motor vehicle's combustion engine in order to feed charge air to the latter. The cooler element 11 comprises elongate pipelines extending at a distance from one another to which cooling flanges are connected. Air passages are arranged between the cooler element's pipelines to allow cooling ambient air to pass through the cooler element. The cooler element 11 is of conventional configuration and its pipelines and cooling flanges are not depicted in the drawings. Charge air from said compressor is led through the cooler element's pipelines and is cooled, via the cooling flanges, by ambient air which passes through the air passages between the pipelines.

The cooler device 1 also comprises an EGR cooler 20 of conventional configuration with a substantially platelike cooler element 21 for cooling of exhaust gases which are diverted from the motor vehicle's exhaust line in order to be led back to the motor vehicle's combustion engine. The EGR cooler 20 is adapted to cooling these exhaust gases before they are led back to the combustion engine and is intended to receive via an undepicted pipeline warm exhaust gases from the motor vehicle's exhaust line and to be connected via an undepicted pipeline to the inlet air duct of the motor vehicle's combustion engine in order to feed exhaust gases to the latter. The cooler element 21 comprises elongate pipelines extending at a distance from one another to which cooling flanges are connected. Air passages are arranged between the cooler element's pipelines to allow cooling ambient air to pass through the cooler element. The cooler element 21 is of conventional configuration and its pipelines and cooling flanges are not depicted in the drawings. Exhaust gases from the motor vehicle's exhaust line are led through the cooler element's pipelines and are cooled, via the cooling flanges, by ambient air which passes through the air passages between the pipelines.

The EGR cooler's cooler element 21 and the charge air cooler's cooler element 11 are arranged beside and substantially in plane with one another. In the embodiments illustrated, the EGR cooler 20 is arranged below the charge air cooler 10.

In the examples illustrated, a radiator liquid cooler 30 of conventional configuration with a substantially platelike cooler element 31 for cooling of radiator liquid for the motor vehicle's combustion engine is arranged behind the charge air cooler 10 and the EGR cooler 20 as seen in the motor vehicle's intended direction of movement.

The cooling flow of ambient air through the air passages of the respective cooler elements 11, 21, 31 is generated by forward movement of the motor vehicle and/or by a fan (not depicted). This fan is normally arranged behind the radiator liquid cooler 30 as seen in the motor vehicle's intended direction of movement.

According to the invention, the cooler device 1 comprises:
a screening means 40 which is arranged in front of or behind the charge air cooler's and the EGR cooler's cooler elements 11, 21 to regulate the air flow through the latter, and which comprises a first screening portion 41a associated with the charge air cooler's cooler element 11 and a second screening portion 41b associated with the EGR cooler's cooler element 21, and
a control mechanism 50 by which said screening means 40 is switchable to and fro between an open position in which the screening portions 41a, 41b do not, or at least do not appreciably, limit the air flow through the cooler elements 11, 21, and a closed position in which the screening portions 41a, 41b limit the air flow through the cooler elements 11, 21 more than in the open position in order to counteract ice formation in the latter.

The first screening portion 41a allows more air to pass through than the second screening portion 41b when the screening means 40 is in the closed position, in order thereby to regulate the air flow through said cooler elements 11, 21 in such a way that the air flow through the charge air cooler's cooler element 11 is limited to a lesser extent than the air flow through the EGR cooler's cooler element 21 when the screening means 40 is in the closed position. The second screening portion 41b associated with the EGR cooler's cooler element 21 is with advantage arranged to allow substantially no air to pass through when the screening means 40 is in the closed position.

In the embodiments illustrated, the screening means 40 is arranged immediately behind charge air cooler 10 and the EGR cooler 20 as seen in the intended direction of movement of motor vehicle, i.e. between their coolers 10, 20 and the radiator liquid cooler 30, but it might alternatively be arranged immediately in front of the charge air cooler and the EGR cooler.

The control mechanism 50 may with advantage comprise a pneumatic or hydraulic cylinder 51 for switching the screening means 40, as illustrated in FIG. 1 and FIGS. 5-8.

In the embodiments illustrated in FIGS. 1-4, the screening means 40 takes the form of a louver comprising blades 42a, 42b, 42a', 42b' which are pivotable by the control mechanism 50 to and fro between an open position (see FIGS. 1 and 3) where the blades extend substantially perpendicular to the adjacent sideplanes 12, 22 of the cooler elements 11, 21 and a closed position (see FIGS. 2 and 4) where the blades extend substantially parallel with the adjacent sideplanes 12, 22 of the cooler elements 11, 21. The blades 42b, 42b' which form part of the second screening portion 41b associated with the EGR cooler's cooler element are with advantage arranged to overlap one another in the closed position, whereas the blades 42a, 42a' which form part of the first screening portion 41a associated with the charge air cooler's cooler element are arranged to not overlap one another and to therefore leave air passages 43 between them in the closed position, as illustrated in FIGS. 2 and 4. In the embodiments illustrated in FIGS. 1-4, all the blades 42a, 42b, 42a', 42b' are adapted to being switched jointly by pivoting by the control mechanism 50 when the screening means 40 is switched from the open position to the closed position and from the closed position to the open position.

In the embodiment illustrated in FIGS. 1 and 2, all the blades 42a, 42b are of the same width (in the plane of FIGS. 1 and 2). The blades 42a, 42b have mutually parallel pivot spindles 44a, 44b, whereby the mutual distance between the pivot spindles 44a of the first screening portion's blades 42a is greater than the width of these blades, whereas the mutual distance between the pivot spindles 44b of the second screening portion's blades 42b is smaller than the width of these blades. The distance between the pivot spindles 44a of the first screening portion's blades 42a is thus in this case greater than the distance between the pivot spindles 44b of the second screening portion's blades 42b.

In the embodiment illustrated in FIGS. 3 and 4, the second screening portion's blades 42b' are wider (in the plane of FIGS. 3 and 4) than the first screening portion's blades 42a', whereas the distance between the pivot spindles 44a of the first screening portion's blades 42a is the same as the distance between the pivot spindles 44b of the second screening portion's blades 42b.

According to an alternative embodiment, the screening means comprises at least two sheet-like or disc-like screening elements which face towards one another and have apertures through them. At least one of these screening elements is movable in the plane of its extent relative to another of the screening elements by a control mechanism in such a way that the apertures in the screening elements cooperate to form air passages which extend through the screening means and which are larger when the screening means is in the open position than when the screening means is in the closed position. Said apertures may for example take the form of elongate gaps.

In the embodiment illustrated in FIGS. 5-8, the screening means 40 comprises three disc-shaped screening elements 45a-45c which face one another and have apertures 46a-46c through them. One of these screening elements, more specifically the middle screening element 45b in FIGS. 5-8, is fixed and the other two screening elements 45a, 45c, which are arranged on opposite sides of the fixed screening element 45b, are movable and adapted to being moved in their plane of extent relative to the fixed screening element 45b in mutually opposite directions when the screening means 40 is switched by the control mechanism 50 from the open position to the closed position and from the closed position to the open position. This mutually opposite movement of the screening elements 45a, 45c is effected in the example illustrated by a T-shaped lever 52 which is rotated by a cylinder 51. The transverse lower portion 53 of the lever is supported at its middle for rotation relative to the fixed screening element 45b and at its opposite ends relative to the respective movable screening elements 45a, 45c. The apertures 46a-46c in the screening elements 45a-45c cooperate to form air passages 47 which extend through the screening means 40 and which are larger when the screening means is in the open position (see FIGS. 5 and 7) than when the screening means is in the closed position (see FIGS. 6 and 8). In the embodiment illustrated in FIGS. 5-8, said apertures 46a-46c take the form of elongate gaps. In the embodiment illustrated in FIGS. 5-8, the portion of the movable screening elements 45a, 45c which forms part of the first screening portion 41a associated with the charge air cooler's cooler element 11, in the example illustrated the upper portion of the screening elements, is provided with wider apertures 46a, 46c than the portion of these screening elements which forms part of the second screening portion 41b associated with the EGR cooler's cooler element 21, in the example illustrated the lower portion of the screening elements.

Figures 7, 8, 9, 10, 11:
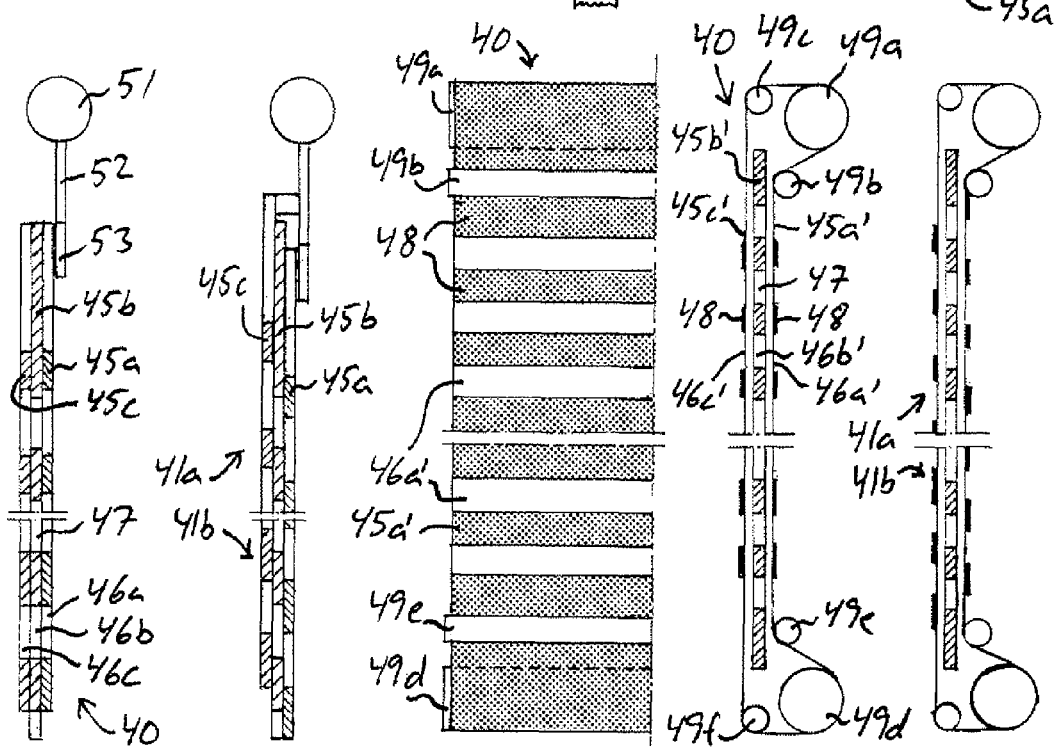
FIG. 7 depicts a schematic vertical cross-section of the screening means according to FIG. 5 in an open position.
FIG. 8 depicts a schematic vertical cross-section of the screening means according to FIG. 5 in a closed position.
FIG. 9 depicts a schematic front view of part of a screening means according to another alternative embodiment.
FIG. 10 depicts a schematic vertical cross-section of the screening means according to FIG. 9 in an open position.
FIG. 11 depicts a schematic vertical cross-section of the screening means according to FIG. 9 in a closed position.

In the embodiment illustrated in FIGS. 9-11, the screening means 40 comprises a fixed screening element 45b' in the form of a disc provided with apertures 46b' through it and two movable screening elements 45a', 45c' arranged on opposite sides of the fixed screening element. Each of the movable screening elements 45a', 45c' takes the form of a flexible mesh which is provided with masking tapes 48 made of material with limited or no permeability to air and which has apertures 46a', 46c' in the form of unmasked mesh areas which are permeable to air between the masking tapes 48. The movable screening elements 45a', 45c' are connected together and run over rotatable rollers 49a-49e. One of these rollers is rotatable by means of a suitable drive device, e.g. in the form of an electric motor, in order to effect movement of the movable screening elements 45a', 45c' in desired directions. The apertures 46a'-46c' in the screening elements 45a'-45c' cooperate to form air passages which extend through the screening means 40 and which are larger when the screening means is in the open position (see FIG. 10) than when the screening means is in the closed position (see FIG. 11). In the embodiment illustrated in FIGS. 9-11, the portion of the movable screening elements 45a', 45c' which forms part of the first screening portion 41a associated with the charge air cooler's cooler element 11, in the example illustrated the upper portion of the screening elements 45a', 45c', is provided with wider apertures 46a', 46c' than the portion of these screening elements which forms part of the second screening portion 41b associated with the EGR cooler's cooler element 21, in the example illustrated the lower portion of the screening elements 45a', 45c'.

The invention is of course in no way limited to the embodiments described above, since many possibilities for modifications thereof are likely to be obvious to a specialist in the field without thereby departing from the fundamental concept of the invention as defined in the attached claims.

The invention claimed is:

1. A cooler device for a motor vehicle, the cooler device comprising:
a charge air cooler having a first cooler element for cooling of charge air for a combustion engine of the motor vehicle and an EGR cooler having a second cooler element for cooling of exhaust gases which are to be led back to the combustion engine, the first cooler element and the second cooler element are arranged substantially in plane with one another;
a screening device arranged in front of or behind the cooler elements, the device is operable to regulate air flow through the cooler elements, the screening device comprises a first screening portion associated with the first cooler element and a second screening portion associated with the second cooler element; and
a control mechanism operable to switch the screening device to and from between an open position in which the screening portions do not, or at least do not appreciably, limit the air flow through the cooler elements, and a closed position in which the screening portions limit the air flow through the cooler elements;
the first screening portion is configured to allow more air to pass through than the second screening portion allows to pass through when the screening device is in the closed position, in order thereby to regulate the air flow through the cooler elements in such a way that the air flow through the first cooler element is limited to a lesser extent than the air flow through the second cooler element when the screening device is in the closed position.

2. A cooler device according to claim 1, wherein the second screening portion is configured to allow substantially no air to pass through when the screening device is in the closed position.

3. A cooler device according to claim 1, wherein the screening portions comprise:
pivotable blades wherein each blade is supported on a respective pivot;
the second screening portion includes second blades, the second blades and the pivots of the second blades being positioned so that the second blades overlap one another in the closed position; and
the first screening portion includes first blades, the first blades being shaped and positioned so as to leave air passages between neighboring first blades when the screening device is in the closed position.

4. A cooler device according to claim 3, wherein the second blades are wider in the direction through the pivots than said first blades.

5. A cooler device according to claim 4, wherein the first and the second blades have mutually parallel pivots and the mutual distance between the pivots of neighboring ones of the first blades is greater than the width of the first blades, and the mutual distance between the pivots of neighboring ones of the second blades is the same as or smaller than the width of the second blades.

6. A cooler device according to claim 4, wherein the pivots of neighboring ones of the first and the second blades are spaced apart a same distance.

7. A cooler device according to claim 3, wherein the first and the second blades have mutually parallel pivots and the mutual distance between the pivots of neighboring ones of the first blades is greater than the width of the first blades through the pivots thereof, and the mutual distance between the pivots of neighboring ones of the second blades is the same as or smaller than the width of the second blades.

8. A cooler device according to claim 1, wherein the screening device comprises:
at least two sheet or disk screening elements which face towards one another, and each screening element has apertures through extending through the screening element;
at least one of the screening elements is movable in its plane of extent relative to another of the screening elements; and
the apertures in the screening elements are arranged to cooperate to form air passages which extend through the screening device and which are larger when the screening device is in the open position than when the screening device is in the closed position.

9. A cooler device according to claim 8, wherein the screening elements comprise a fixed screening element and comprise two movable screening elements which are operable to being moved in their respective planes of extent relative to the fixed screening element in mutually opposite directions when the screening device is switched by the control mechanism from the open position to the closed position and from the closed position to the open position.

10. A cooler device according to claim 9, wherein the fixed screening element comprises a disc having apertures through the disk; and
each of the movable screening elements comprises a flexible mesh having masking tapes made of material with limited or no permeability to air and which has apertures through the material in the form of unmasked mesh areas which are permeable to air and which are between the masking tapes.

11. A cooler device according to claim 10, wherein the movable screening elements are connected together.

12. A cooler device according to claim 8, wherein the screening elements comprise discs provided with gap-like apertures.

* * * * *

UNITED STATES PATENT AND TRADEMARK OFFICE
CERTIFICATE OF CORRECTION

| | | |
|---|---|---|
| PATENT NO. | : 8,025,045 B2 | Page 1 of 1 |
| APPLICATION NO. | : 12/305679 | |
| DATED | : September 27, 2011 | |
| INVENTOR(S) | : Pettersson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

This patent is subject to a terminal disclaimer.

Signed and Sealed this
Seventeenth Day of January, 2012

David J. Kappos
*Director of the United States Patent and Trademark Office*

Disclaimer

8,025,045—Rickard Pettersson, Rönninge (SE); Henrik Nyrèn, Södertälje (SE); Rolf Dybdal, Jönåker (SE) COOLER ARRANGEMENT FOR A MOTOR VEHICLE, Patent dated Sep. 27, 2011. Disclaimer filed May 12, 2011, by the Assignee, Scania CV AB (Publ).
The term of this patent, subsequent to the patent number 8,020,536 has been disclaimed.

(*Official Gazette January 24, 2012*)